United States Patent [19]
Craig et al.

[11] 4,120,050
[45] Oct. 10, 1978

[54] DEVOLATILIZING VENT

[75] Inventors: Gregory C. Craig; William B. Eckstein, both of Piqua, Ohio

[73] Assignee: The French Oil Mill Machinery Company, Piqua, Ohio

[21] Appl. No.: 778,464

[22] Filed: Mar. 17, 1977

[51] Int. Cl.² .............................................. B29B 1/10
[52] U.S. Cl. ................................. 366/75; 159/2 E; 264/102
[58] Field of Search ............................ 259/191-193; 159/2 E; 264/101, 102; 425/203, DIG. 60, 812; 366/75

[56] References Cited

U.S. PATENT DOCUMENTS

| | | | |
|---|---|---|---|
| 3,078,512 | 2/1963 | DeHaven | 159/2 E |
| 3,150,214 | 9/1964 | Scalora et al. | 159/2 E |
| 3,524,222 | 8/1970 | Gregory et al. | 159/2 E |
| 3,563,514 | 2/1971 | Shattuck | 159/21 E X |
| 3,937,778 | 2/1976 | Tanaka | 264/102 |

FOREIGN PATENT DOCUMENTS

671,876  3/1966  Belgium .................................. 259/191

Primary Examiner—Philip R. Coe
Attorney, Agent, or Firm—Biebel, French & Nauman

[57] ABSTRACT

A vent adapted for use with a devolatilizer having a mechanical press includes a closed vent chamber extending generally vertically above the mechanical press and having a horizontal cross-sectional area which increases from the bottom to the top of the vent chamber. An input opening at the bottom of the chamber communicates with the mechanical press and an extraction port adjacent the upper portion of the chamber removes the vapors from the chamber and transports them to volatile recovery apparatus or disposal apparatus. A tamping means, including one or more actuatable tamping rods in the vent chamber, is provided for forcing the material being processed back into the mechanical press. The vent is maintained free of particle build-up and the processed material is returned to the mechanical press.

10 Claims, 2 Drawing Figures

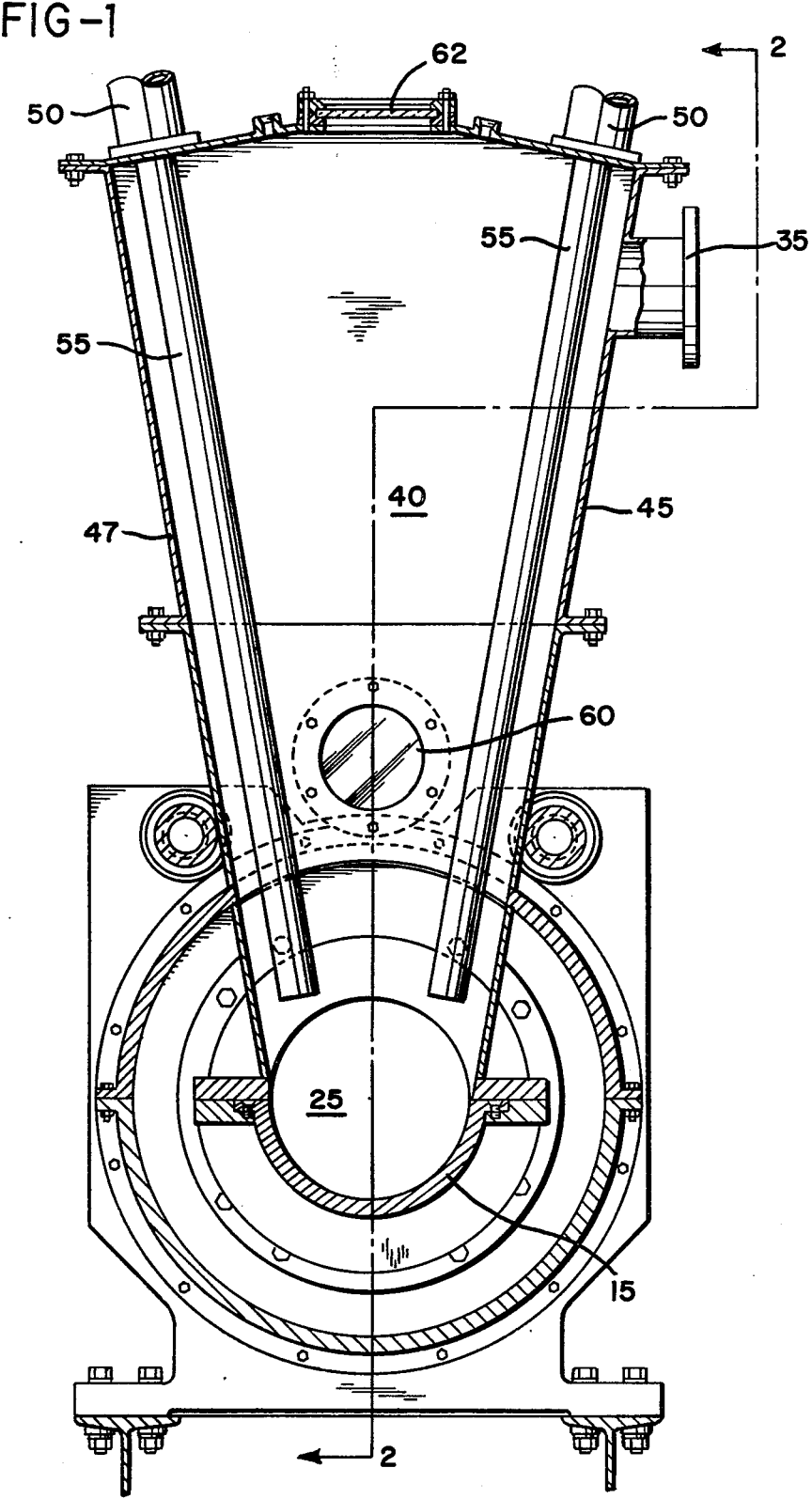

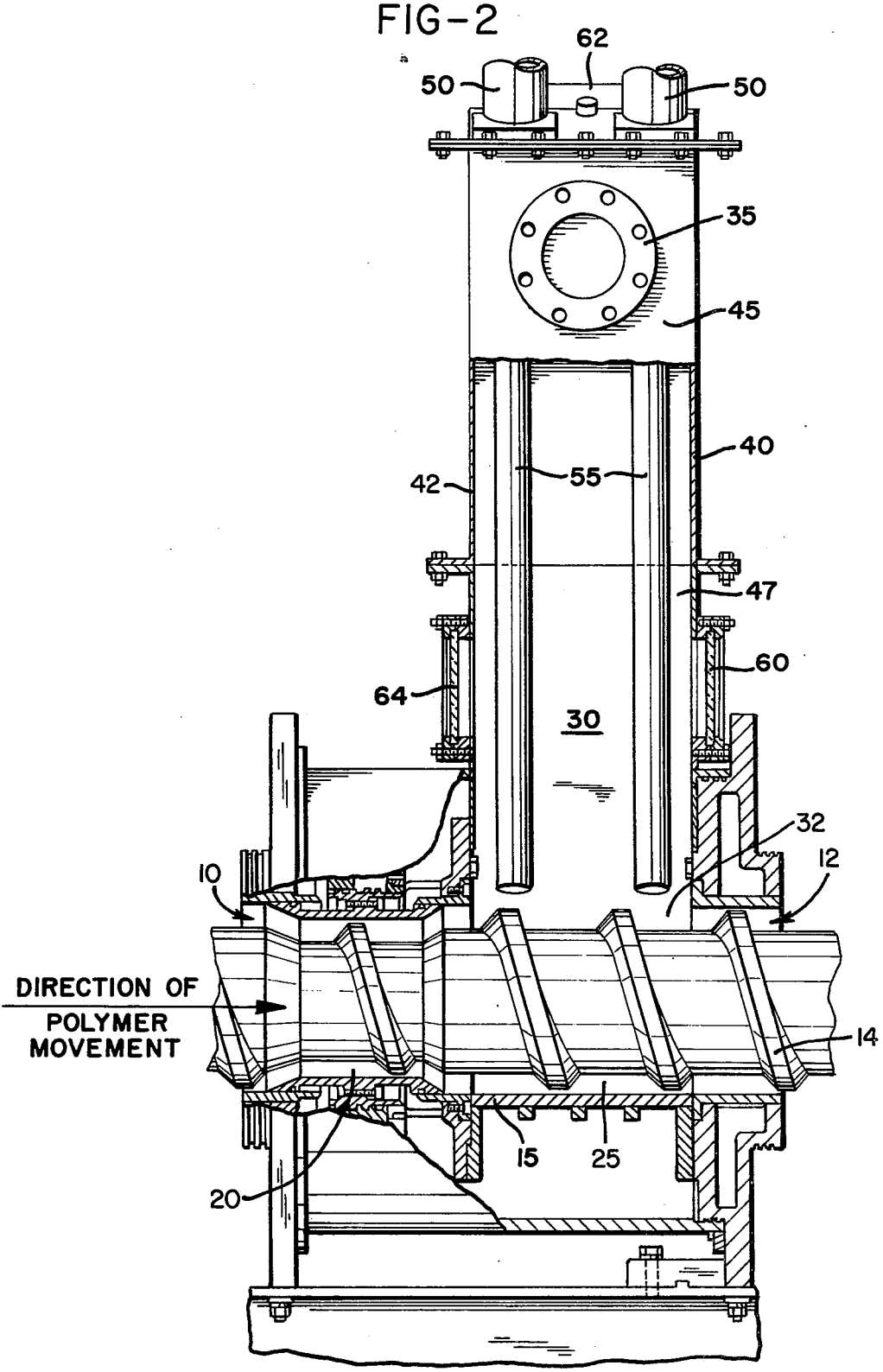

DEVOLATILIZING VENT

BACKGROUND OF THE INVENTION

The present invention relates to apparatus for removing volatile substances or the like from viscous materials such as polymer substance. This process is termed devolatilization. A polymer substance which is to be devolatilized is fed into a cylindrical cage and carried through the cage by screw members. The polymer is moved through a vented section of the cage where the pressure on the polymer is substantially reduced, permitting the volatile substance to vaporize and escape. The devolatilized polymer is then carried into an enclosed screw section for further working or for extrusion sizing.

One such devolatilizing device is shown in U.S. Pat. No. 3,684,252, to Nissle et al, issued Aug. 15, 1972, and assigned to the assignee of the present invention. Nissle et al shows devolatilizing apparatus in which the vent section includes a number of slit-like vent openings around the periphery of the devolatilizer cage. As the polymer material passes through the vent section of the cages the resulting vapors pass through the slit-like vent openings. The vapor is then pumped to a recovery apparatus.

In such an arrangement it is very difficult to keep the slit-like vent openings from becoming clogged. As the volatile substance evaporates in a vent section, small pieces of polymer, called "fines", may be carried by the vapor into the slit-like openings, obstructing these openings and inhibiting the venting process. Since the vent section must be totally enclosed to recover the vapors, the accumulated fines and extrusions may be cleaned only by a complete shut-down and vent disassembly.

The problem of keeping a vent in such a device free of obstructions has been recognized in the past. U.S. Pat. No. 3,350,742, issued Nov. 7, 1967 to Wood shows a vent including a vent liner which is to be replaced periodically. A sight glass is provided in the top of the vent to permit inspection of the vent and liner. Although reducing the down time of the devolatilizer, this vent liner arrangement still requires frequent maintenance and cleaning of the liners.

U.S. Pat. No. 3,737,150, issued June 5, 1973 to Otake shows a vent arrangement in which the vent tube extends through the wall of the cylindrical cage with the inner end of the tube terminating adjacent to the peripheral surface of the screw shaft. A notch in the end of the vent tube is intended to prevent the material being worked from moving up the vent tube and thus clogging it.

U.S. Pat. No. 3,212,133, issued Oct. 19, 1965 to Heidrich, shows an extruder having a vent duct which includes a screw conveyor for returning material to the cylindrical cage which is carried into the duct by the escaping volatile substances being vented. Such an arrangement requires a motor or actuator for the screw conveyor and further is difficult to clean and inspect.

U.S. Pat. No. 3,781,132, issued Dec. 25, 1973, to Latinen, discloses a devolatilizer having a vent which includes wedge-shaped members at the vent opening to prevent the polymer being worked from moving into the vent. This device is subject to clogging, however, since the wedges define a relatively small opening leading into the vent tube.

Extrusion devices in which the volatile matter vapor is not recycled, such as U.S. Pat. No. 3,834,440, issued to McCracken, on Sept. 10, 1974, are easier to vent. McCracken shows a device in which solvent vapor escapes from both the input and output openings of the extrusion dryer. While the input arrangement for the dryer includes a conical hopper, this hopper is continuously fed with the additional polymer material to be worked. The vented gases, therefore, must move upwardly through the material in the supply hopper and fines in the vapor are thus of little consequence.

SUMMARY OF THE INVENTION

A vent for use with a mechanical devolatilizing device including a cylindrical cage having an inlet and outlet, a rotatable shaft carrying a plurality of screw members in the cage arranged to convey the polymer or other material to be worked through the cage, and means for rotating the shaft, includes means defining a vent opening in the upper portion of the cage. A vent duct means communicates with the vent opening and defines a vent chamber into which the volatile substances may escape. The vent chamber extends vertically above the vent opening and the horizontal cross-sectional area of the vent chamber increases in relation to the distance above the vent opening. A vapor return means comprises means for positively extracting vapor from said chamber. Tamping means in the chamber may be provided for pushing back into the cylindrical cage any polymer accumulating in the chamber. A sight glass may be provided for viewing the interior of the chamber and observing the tamping means. The chamber may be defined by a first pair of parallel walls and a second pair of walls in converging relationship to each other with said second pair of walls being perpendicular to said first pair of walls.

Accordingly, it is an object of the invention to provide a closed vent for removing vapors from the vent section of an extruder with the vent opening upwardly and increasing in cross-sectional area from its lower portion to its upper portion such that the rate of flow of escaping vapors is decreased and particles being carried in the escaping vapors fall back into the screw section of the device; further to provide such a vent having tamping means in the vent for moving material from the vent chamber into the screw section of the extruder; and, further to provide such a vent having an extraction port in the upper portion of the vent chamber for removal of volatile vapors from said chamber.

Other objects and advantages of the present invention will be apparent from the following description, the accompanying drawings and the appended claims.

BRIEF DESCRIPTION OF THE DRAWINGS

FIG. 1 is a cross-sectional view of the vent arrangement of the present invention with portions broken away and in elevation; and FIG. 2 is a sectional view taken of the vent of the present invention taken generally along line 2—2 in FIG. 1.

DETAILED DESCRIPTION OF THE DRAWINGS

Referring now to FIGS. 1 and 2, there is shown a sectional view of the vent configuration of the present invention. This vent is intended to be used with apparatus such as a screw extruder in which a viscous material, such as a polymer, is worked. Only the devolatilizing section of the device is shown in the drawings. Typically such a device includes a cylindrical cage which has an inlet 10 and an outlet 12 and a rotatable shaft 14 carrying a plurality of screw members in the cage to convey the polymer through the cage as the shaft is rotated. FIG. 1 is a view looking down the length of cage 15 in the direction of the outlet of the devolatilizer. The rotatable shaft 14 is omitted from FIG. 1 of the drawings for the sake of simplicity in illustration, but is shown diagrammatically in FIG. 2.

FIG. 2 is a sectional view taken generally along line 2—2 in FIG. 1. As seen in FIG. 2, the polymer is moved through cage 15 from left to right. The viscous polymer material enters a constricted section 20 of the cage prior to moving into vent section 25. As the polymer moves into section 25, volatile substances present in the polymer are released as the polymer expands in the region of the vent section. The vaporized substances present in the vent section of the mechanical press may escape into the vent of the present invention. Vent duct means for defining a closed vent chamber 30 into which vapor may escape extends generally vertically above an input opening 32 at the bottom of the chamber. As seen in FIG. 2, cage 15 defines the vent opening 32 in the upper portion of the cage.

As seen best in FIG. 1, the horizontal cross-sectional area of vent chamber 30 increases from the bottom to the top of the chamber. This increase in cross-sectional area causes the velocity of the vapors escaping into the vent 30 to be reduced. Consequently, small pieces of the polymer material which may have been carried upward by the escaping vapor will drop back into vent section 25. These pieces of polymer material will therefore be returned to the main stream of material flow in the mechanical press screw.

To one side of the upper portion of chamber 30, is a vapor extraction port means 35. The vapor in chamber may then be piped to recovery apparatus where it is condensed and prepared for reuse or disposal. This vapor may also be piped to an apparatus for cleaning prior to discharge into the environment. It should be understood that the pressure in the vent may be either greater than atmospheric pressure or less than atmospheric pressure, depending upon the pressure in cage 15.

The chamber 30 is defined by a first pair of parallel walls 40 and 42 and a second pair of walls 45 and 47 which are in converging relationship with each other. The second pair of walls 45 and 47 are each perpendicular to the first pair of walls 40 and 42. Parallel walls 40 and 42 are perpendicular to the axis of cage 15 while non-parallel walls 45 and 47 are each parallel to the axis of cage 15. It should be understood that vent chambers differently shaped from that shown in the present embodiment would also function properly if the horizontal cross-sectional area of the chamber increases sufficiently from the bottom to the top of the chamber 30. Thus an inverted cone or inverted pyramid design could also function effectively.

From time to time, the polymer material being worked may tend to clog opening 32 and thus impede the venting operation. Also the entrained fines of some materials may tend to adhere to the vertical walls of the vent and gradually accumulate, thus reducing the cross-sectional area of the vent. In order to be able to force the material back into section 25, tamping means for pushing the polymer from the vent chamber 30 into the vent section 25 include pneumatic cylinders 50. These cylinders are used to actuate tamping arms 55 which extend into chamber 30 to clear the chamber of any material which may inhibit the venting process. Depending upon the size and geometric configuration of the vent, a tamping device may be installed. Although no devices are shown attached to the piston shafts 55, a number of apparati may be used such as plates on the bottom of the shafts to increase the area of downward pressure. Scrapping devices may be installed also to clean continuously the vertical walls of any accumulation of fines. The type of attachment used depends upon the nature of the substance being divolatilized and its characteristic behavior during mechanical processing. In some cases the use of any such tamping and cleaning device is not necessary. Sight glasses 60, 62, and 64 are provided to permit inspection of the condition of the vent and to allow the tamping means to be effectively controlled.

The vertical sides and top of the vent may be jacketed to provide means of temperature control via circulation of a heat transfer medium, such as steam or water; this would allow the surfaces to be maintained at a temperature sufficient to prevent recondensation of the vaporized volatile substance. The interior surface of the vent may be coated with a material such as a fluorocarbon polymer or a silicone polymer to promote release of any material which would otherwise adhere to the surfaces.

While the form of apparatus herein described constitutes a preferred embodiment of the invention, it is to be understood that the invention is not limited to this precise form of apparatus, and that changes may be made therein without departing from the scope of the invention.

What is claimed is:

1. A vent for use with devolatilizing apparatus including a cylindrical cage having an inlet and an outlet for a material to be devolatilized, a rotatable shaft carrying a plurality of screw members in said cage arranged to convey the material through said cage, and means for rotating said shaft, comprising:
   means defining a vent opening in the upper portion of the cage,
   vent duct means, communicating with said vent opening, for defining a closed vent chamber into which vapor may escape, said vent chamber extending substantially vertically above said vent opening, the horizontal cross-sectional area of said chamber increasing from the bottom to the top of said chamber, and
   vapor return means communicating only with the upper portion of said vent chamber for extracting vapor from said chamber.

2. The vent of claim 1 in which said vapor return means comprises means for positively extracting vapor from said chamber.

3. The vent of claim 2 further comprising a plurality of tamping means in said vent chamber, including a plurality of independently actuatable tamping rods, for pushing material from said vent chamber into said cage.

4. The vent of claim 3 in which said vent duct means further comprises sight glass means for permitting the interior of said chamber and said tamping mean to be observed.

5. The vent of claim 4 in which said tamping means comprises pneumatic cylinders exterior to said chamber and connected to move said tamping rods within said chamber.

6. The vent of claim 1 in which said chamber is defined by a pair of parallel walls perpendicular to the axis of said cage and by a pair of non-parallel walls, each of which is parallel to the axis of said cage.

7. A vent, adapted for use with a desolventizer which processes material and separates the volatiles therefrom, said desolventizer including a cylindrical cage having an inlet and an outlet for material to be devolatilized, comprising:
  means defining a vent opening in the upper portion of the cage,
  means defining a closed vent chamber having an input opening at the bottom of said chamber communicating with said vent opening through which the volatile vapors escape from the processed material, said vent chamber extending substantially vertically above said input opening and increasing in horizontal cross-sectional area from the bottom to the top of said chamber, and
  vapor extraction port means, communicating only with the upper portion of said chamber, for extracting said vapors from said chamber.

8. The device of claim 7 in which the vapor extraction port means is positioned to the side of said vent chamber.

9. The device of claim 8 in which said chamber is defined by a first pair of parallel walls and a second pair of walls in converging relationship with each other, said second pair of walls being perpendicular to said first pair of walls.

10. The device of claim 9 further comprising tamping means positioned in said chamber, said tamping means including an actuable tamping rod, said rod being positioned adjacent to the interior surface of said pair of converging walls.

* * * * *